United States Patent [19]

Jacobs

[11] Patent Number: 4,543,239
[45] Date of Patent: Sep. 24, 1985

[54] PHOSPHORIC ACID EXTRACTION PROCESS

[75] Inventor: Martin J. Jacobs, Terre Haute, Ind.

[73] Assignee: International Minerals & Chemical Corp., Terre Haute, Ind.

[21] Appl. No.: 642,929

[22] Filed: Aug. 21, 1984

[51] Int. Cl.$^4$ .............................................. C01B 25/16
[52] U.S. Cl. .............................. 423/321 S; 423/321 R
[58] Field of Search ................... 423/319, 320, 321 R, 423/321 S, 167, 316

[56] References Cited

U.S. PATENT DOCUMENTS

| | | |
|---|---|---|
| 1,929,443 | 10/1933 | Milligan ............................ 423/321 S |
| 3,304,157 | 2/1967 | Baniel et al. ......................... 423/319 |
| 3,367,749 | 2/1968 | Koerner et al. .................. 423/321 S |
| 3,956,465 | 5/1976 | Amanrich ......................... 423/321 S |
| 4,349,519 | 9/1982 | Hiraga et al. ..................... 423/321 S |
| 4,377,562 | 3/1983 | Hiraga et al. ..................... 423/321 S |
| 4,394,361 | 7/1983 | Berkowitz ........................ 423/321 S |

Primary Examiner—Gregory A. Heller
Attorney, Agent, or Firm—T. L. Farquer; H. E. Post

[57] ABSTRACT

A method for extracting phosphoric acid from wet process phosphoric acid is disclosed. N,N-dialkyl-α-aminoacids are contacted with wet process phosphoric acid to extract substantially pure phosphoric acid therefrom. The N,N-dialkyl-α-aminoacids are dissolved in a diluent.

7 Claims, No Drawings

PHOSPHORIC ACID EXTRACTION PROCESS

The present invention relates to a method of extracting phosphoric acid ($H_3PO_4$) from wet process phosphoric acid. In particular, an N,N-dialkyl-α-aminoacid selectively extracts phosphoric acid from wet process phosphoric acid.

In the wet process for preparing phosphoric acid, phosphate-bearing ore is reacted with sulfuric acid. The resulting product is filtered to remove insolubles such as gypsum, silica and other impurities. The filtered product is very dark in color due largely to dissolved and finely divided carbonaceous material present in the rock. This process is useful in providing phosphoric acid for the fertilizer industry but, due to the large level of impurities present in wet process phosphoric acid, it is unsuitable in the manufacture of sodium phosphate for the detergent industry or for use in making technical grade, food grade or pharmaceutical grade products. Many processes for purifying wet process phosphoric acid are known. Some of these processes are based on extraction of the phosphoric acid by an organic solvent. See, for example, U.S. Pat. Nos. 3,956,456; 4,377,562; 4,394,361; and 4,349,519.

Heretofore, N,N-dialkyl-α-aminoacids have not been disclosed as being useful for extracting phosphoric acid from wet process phosphoric acid.

SUMMARY OF INVENTION

Briefly, in accordance with the present invention, phosphoric acid is extracted from wet process phosphoric acid by contacting an N,N-dialkyl-α-aminoacid with the wet process phosphoric acid.

The present invention is carried out by dissolving an effective amount of one or more N,N-dialkyl-α-aminoacids in a diluent or carrier to form a water immiscible organic phase. The organic phase, containing the amino acid and diluent, is then intimately contacted with the wet process phosphoric acid whereby the phosphoric acid is extracted into the organic phase. The organic phase is then separated from the aqueous phase and the phosphoric acid is recovered therefrom employing standard isolation and purification procedures.

DETAILED DESCRIPTION OF THE INVENTION

When used herein, the terms "alkyl" and "alkenyl" are meant to encompass straight, branched and cyclic alkyl and alkenyl moieties. The terms "$C_1$-$C_{18}$", "$C_4$-$C_{18}$", "$C_3$-$C_8$" and "$C_8$-$C_{18}$", when used to modify alkyl or alkenyl, refer to the number of carbon atoms, inclusive, in the alkyl or alkenyl moiety, i.e., 1–8, 4–18, 3–8 and 8–18 carbon atoms, respectively.

When used herein, the terms "diluent" or "carrier" refer to any organic solvent which is either immiscible or partially miscible with water and forms a two-phase system when mixed with wet process phosphoric acid. Suitable diluents employed in the practice of the present invention include common organic solvents, such as, hydrocarbons, alcohols, acetate esters and those solvent systems described in U.S. Pat. Nos. 3,956,465; 4,377,562; 3,349,519; and 4,394,361, all of which are incorporated herein by reference. Preferred diluents include n-butanol, isobutanol, ethyl acetate, methyl isobutyl ketone, toluene, benzene, xylene, isobutyl acetate, butyl acetate, nitrobenzene, tributyl phosphate and 2-ethylhexyl alcohol. Especially preferred solvents include toluene and isobutyl acetate.

An essential aspect of the present invention involves the addition of one or more N,N-dialkyl-α-aminoacids to the diluent. Suitable N,N-dialkyl-α-aminoacids include amino acids of the formula:

wherein each R independently represents a $C_1$-$C_{18}$ alkyl; and Y represents a $C_4$-$C_{18}$ alkyl or $C_4$-$C_{18}$ alkenyl.

Usually, the N,N-dialkyl-α-aminoacid is a compound of formula 1 above wherein each R independent represents a $C_3$-$C_{18}$ alkyl and Y represents a $C_8$-$C_{18}$ alkyl. A preferred N,N-dialkyl-α-aminoacid is N,N-di-n-butyl-α-aminododecanoic acid.

The N,N-dialkyl-α-aminoacid is added to the diluent or carrier in an amount effective to extract the phosphoric acid from the wet process phosphoric acid. Usually the amount of amino acid added to the organic solvent is dependent upon the amount of $P_2O_5$ in the wet process phosphoric acid. Advantageously, the molar ratio of amino acid:$P_2O_5$ is from about 0.5:1 to about 1.5:1 and preferably about 1:1 or about equimolar proportions.

The organic phase, containing the N,N-dialkyl-α-amino acid, and the wet process phosphoric acid are brought into intimate contact with each other to perform the extraction procedure. The organic phase forms an immiscible layer with the wet process phosphoric acid. After the extraction procedure, the organic phase layer contains purified phosphoric acid, while the wet process phosphoric acid phase contains $P_2O_5$ in addition to impurities present in the initial wet process phosphoric acid sample.

The volumetric phase ratio of organic phase to the wet process phosphoric acid phase can vary depending upon several factors, such as the concentration of $P_2O_5$ in the wet process phosphoric acid sample, the amount of impurities present in the initial wet process phosphoric acid sample, and the particular organic solvent employed. Volumetric phase ratios of organic phase:wet process phosphoric acid samples of from about 1:1 to about 20:1 will generally be employed. Under most circumstances, an extraction or contacting period per stage of about 5 minutes is sufficient, although the extraction time usually may be reduced to between about 0.5 to about one (1) minute. The most efficient volumetric ratios can be readily determined by one skilled in the art depending upon the above mentioned factors.

The organic phase may be contacted with the wet process phosphoric acid sample by any of the well known procedures employed in solvent extractions. While continuous countercurrent methods are preferred, batch, continuous batch and batch countercurrent methods may also be used. Liquid-liquid contacting means may comprise a pulse column, a countercurrent rotating disc column, or other known systems. The temperature and pressure at which the present extraction process is conducted are not critical. Advantageously, the present extraction process is conducted at ambient temperature and pressure.

After the phosphoric acid has been extracted from the wet process phosphoric acid phase into the organic phase, the phases are physically separated. The phosphoric acid is then recovered from the organic phase employing well known recovery or purification techniques, such as, for example, washing the organic phase with water which removes the phosphoric acid therefrom and additionally regenerates the extractant for reuse.

The following examples illustrate the practice of the recent invention but are not to be construed as limiting the scope.

EXAMPLE 1

Extraction devices containing two theoretical stages were simulated in the laboratory using separatory funnels to illustrate the extractant properties of N,N-di-n-butyl-α-aminododecanoic acid. Twenty-five (25) milliliters (ml) of wet process phosphoric acid feed (fertilizer grade) containing $P_2O_5$ (0.0673 mole), $H_2SO_4$ (0.0056 mole) and $H_2SiF_6$ (0.00093 mole), were extracted with a 300 ml mixture of N,N-di-n-butyl-α-aminododecanoic acid (0.066 mole) in toluene. Upon analysis, the wet process phosphoric acid raffinate contained: $P_2O_5$ (0.05515 mole), $H_2SO_4$ (0.0014 mole) and $H_2SiF_6$ (0.00076 mole). The organic phase (pregnant extract) was washed with five 25 ml-volumes of water to isolate the phosphoric acid and substantially regenerate the solvent extractant.

EXAMPLE 2

Substantially the same procedures of Example 1 were repeated except that the extractant employed was a 300 ml mixture of N,N-di-n-butyl-α-aminododecanoic acid (0.06 mole) in isobutyl acetate. Upon analysis, the wet process phosphoric acid raffinate contained: $P_2O_5$ (0.0291 mole), $H_2SO_4$ (0.00036 mole) and $H_2SiF_6$ (0.00066 mole). The organic phase (pregnant extract) was washed with five 25 ml-volumes of water to isolate the phosphoric acid and substantially regenerate the solvent extractant.

In similar operations, various organic diluents and N,N-dialkyl-α-aminoacids are employed, in the various ratios described herein, to extract phosphoric acid from wet process phosphoric acid with good results.

I claim:

1. A method of extracting phosphoric acid from wet process phosphoric acid containing impurities which comprises contacting the wet process phosphoric acid with an effective phosphoric acid-extracting amount of an N,N-dialkyl-α-aminoacid wherein the N,N-dialkyl-α-aminoacid is dissolved in a diluent and recovering the phosphoric acid therefrom.

2. The method of claim 1 wherein said N,N-dialkyl-α-aminoacid corresponds to the formula

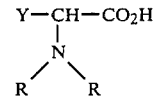

wherein each R independently represents a $C_1$–$C_{18}$ alkyl; and represents a $C_4$–$C_{18}$ alkyl or $C_4$–$C_{18}$ alkenyl.

3. The method of claim 2 wherein each R independently represents $C_3$–$C_8$ alkyl and Y represents $C_8$–$C_{18}$ alkyl.

4. The method of claim 3 wherein each R represents n-butyl and Y represents $C_{10}H_{21}$.

5. The method of claim 4 wherein the diluent is toluene or isobutyl acetate.

6. The method of claim 2 wherein the diluent is n-butanol or isobutanol.

7. The method of claim 6 wherein each R represents n-butyl and Y represents $C_{10}H_{21}$.

* * * * *